United States Patent
Pecen et al.

(10) Patent No.: US 9,673,844 B2
(45) Date of Patent: *Jun. 6, 2017

(54) METHODS AND APPARATUS FOR PERFORMING IMPEDANCE MATCHING

(71) Applicant: BLACKBERRY LIMITED, Waterloo (CA)

(72) Inventors: Mark Pecen, Waterloo (CA); James P. Warden, Waterloo (CA); Shirook M. H. Ali, Waterloo (CA); Amir Danak, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,101

(22) Filed: Mar. 22, 2016

(65) Prior Publication Data

US 2016/0204808 A1    Jul. 14, 2016

Related U.S. Application Data

(63) Continuation of application No. 13/767,200, filed on Feb. 14, 2013, now Pat. No. 9,325,355.

(51) Int. Cl.
| | |
|---|---|
| *H04B 1/04* | (2006.01) |
| *H01Q 11/12* | (2006.01) |
| *H04B 1/40* | (2015.01) |
| *H03C 1/52* | (2006.01) |
| *H01Q 1/52* | (2006.01) |

(52) U.S. Cl.
CPC ............. *H04B 1/0458* (2013.01); *H01Q 1/52* (2013.01)

(58) Field of Classification Search
CPC .................................. H04B 1/0458; H03H 7/38
USPC ....... 455/120, 127.1, 129, 77, 107, 124–125
See application file for complete search history.

(56) References Cited

U.S. PATENT DOCUMENTS

| | | | | |
|---|---|---|---|---|
| 4,704,573 A | * | 11/1987 | Turner, Jr. ............. | G01R 27/06 324/646 |
| 6,417,732 B1 | * | 7/2002 | Radomski ............... | H03F 1/345 330/207 P |
| 8,045,928 B2 | * | 10/2011 | Peng ........................ | H01Q 1/24 455/115.1 |
| 8,923,783 B2 | * | 12/2014 | Ashizuka ............. | H04B 1/0458 333/126 |

(Continued)

FOREIGN PATENT DOCUMENTS

| | | |
|---|---|---|
| EP | 2388925 A1 | 11/2011 |
| ZA | 8604917 | 2/1987 |

*Primary Examiner* — Simon Nguyen
(74) *Attorney, Agent, or Firm* — Guntin & Gust, PLC; Jay Anderson

(57) ABSTRACT

A system that incorporates teachings of the subject disclosure may include, for example, determining a first voltage standing wave ratio (VSWR), selecting a VSWR circle from among a group of VSWR circles based on the first VSWR, identifying a group of sets of tuning settings for variable reactance elements of a matching network of the communication device where the identifying of the group of sets of tuning settings is based on each set of tuning settings of the group of sets of tuning settings being associated with the VSWR circle, and selecting a set of tuning settings from among the group of sets of tuning settings responsive to a second VSWR determined for the set of tuning settings satisfying a VSWR threshold. Other embodiments are disclosed.

20 Claims, 15 Drawing Sheets

(56) References Cited

U.S. PATENT DOCUMENTS

| | | | |
|---|---|---|---|
| 9,325,355 B2* | 4/2016 | Pecen | H01Q 1/52 |
| 2007/0197180 A1 | 8/2007 | McKinzie et al. | |
| 2008/0186105 A1* | 8/2008 | Scuderi | H03H 7/40 |
| | | | 333/17.3 |
| 2009/0167457 A1* | 7/2009 | Melde | H01P 5/04 |
| | | | 333/32 |
| 2009/0253385 A1 | 10/2009 | Dent et al. | |
| 2011/0086600 A1 | 4/2011 | Muhammad | |
| 2011/0189964 A1 | 8/2011 | Jeon et al. | |
| 2011/0254753 A1 | 10/2011 | Ozone et al. | |
| 2011/0285603 A1 | 11/2011 | Skarp | |
| 2012/0041699 A1 | 2/2012 | Sestok | |
| 2012/0051409 A1 | 3/2012 | Brobston et al. | |
| 2013/0005288 A1* | 1/2013 | Scheele | H03H 7/38 |
| | | | 455/334 |
| 2013/0027129 A1 | 1/2013 | Langer | |
| 2013/0040593 A1* | 2/2013 | Sestok | H04B 17/12 |
| | | | 455/226.4 |
| 2013/0207872 A1 | 8/2013 | Bakalski | |
| 2013/0325149 A1* | 12/2013 | Manssen | G05B 13/02 |
| | | | 700/37 |
| 2014/0009362 A1 | 1/2014 | Ho et al. | |
| 2014/0024321 A1* | 1/2014 | Zhu | H04B 1/0458 |
| | | | 455/77 |
| 2014/0120852 A1 | 5/2014 | Ashizuka | |
| 2014/0175896 A1 | 6/2014 | Suzuki | |
| 2016/0204808 A1 | 7/2016 | Pecen et al. | |

* cited by examiner

100

200

300

Quantized L-C1-C2 values that produce a match from that point on the constant VSWR circle Constant VSWR Circles – VSWR is the same for all R+jX touching the circle

400

600

900

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

METHODS AND APPARATUS FOR PERFORMING IMPEDANCE MATCHING

CROSS-REFERENCE TO RELATED APPLICATION(S)

This application is a continuation of U.S. patent application Ser. No. 13/767,200 filed Feb. 14, 2013 by Pecen et al., entitled "Methods and Apparatus for Performing Impedance Matching." All sections of the aforementioned application(s) are incorporated herein by reference in its entirety.

FIELD OF THE DISCLOSURE

The subject disclosure relates to a method and apparatus for performing impedance matching.

BACKGROUND

Portable wireless devices, such as smart phones and tablets, have antennas incorporated into their industrial designs. These antennas can be multi-band, operating on multiple frequency bands such as in the range of 700 MHz to 2690 MHz. It is expected that many more frequency bands will be implemented in portable devices in order to ease the capacity congestion of the wireless cellular frequency bands. Impedance matching over a large range of Radio Frequency (RF) bandwidth becomes increasingly more challenging as the number of supported bands increases.

As a result, researchers in the field of cellular wireless technology have focused on what has become known as "tuneable systems", i.e., the means of tuning and matching between RF components themselves and their associated antenna systems. The impedance transformation and matching problem has been known in the industry since the early days of wireless technology, viz., that a source of RF energy should match the impedance of its respective load in order for that source to deliver maximum useful power to the load.

BRIEF DESCRIPTION OF THE DRAWINGS

Reference will now be made to the accompanying drawings, which are not necessarily drawn to scale, and wherein:

FIG. 20 depicts an illustrative embodiment of a look-up table utilized by the communication device of FIG. 20 for controlling tunable reactive elements utilized by the communication device;

DETAILED DESCRIPTION

Figure 1:
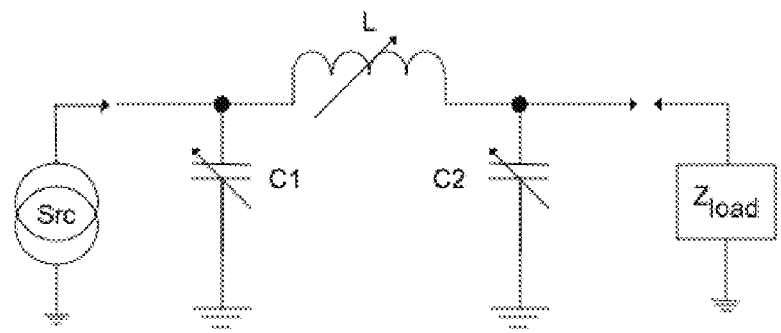
FIG. 1 depicts an illustrative embodiment of a matching network for a communication device.

The subject disclosure describes, among other things, illustrative embodiments for impedance matching for communication devices. By dynamically tuning communication devices based on impedance mismatches, the exemplary embodiments can enable a mobile terminal to assist a network in better distributing the network load, such as over as many cells as possible. The exemplary embodiments can provide for a large reduction in uncertainty in the behavior of a dynamically tuneable system and/or can provide for the elimination of a large portion of computing instructions that require a substantial amount of processing power and therefore processing time and energy usage to achieve.

One or more of the exemplary embodiments include identifying a group of sets of tuning values associated with a particular Voltage Standing Wave Ratio (VSWR) circle and further identifying a target set of tuning values among the group based on its particular calculated or otherwise obtained VSWR. One or more of the exemplary embodiments can also confirm or otherwise analyze monitored reflected power based on monitoring of received power, such as to determine whether a low reflected power measurement is a result of a desired matching state rather than as a result of a low transmitted power.

The exemplary embodiments enable matching the source impedance to the complex impedance of an antenna system, thereby delivering a) maximum or desired power from a transmitter to the antenna and/or b) maximum or desired received signal power from the antenna to the receiver components. The exemplary embodiments of impedance matching can operate according to various radio access technologies. For instance, the exemplary embodiments can provide impedance matching for broadband cellular technologies such as Orthogonal Frequency Division Multiplexing (OFDM) used by the $4^{th}$ Generation Long-Term Evolution (LTE) and LTE-Advanced technologies which operate across a fairly large expanse of radio spectrum. Antennas tend to have optimal matching within a small range within the band of desired operation, and since the efficiency of an antenna is related to its radiation resistance, there can be a constant tradeoff between bandwidth and efficiency, viz. that the greater the bandwidth of the antenna, the lower the efficiency tends to be. The exemplary embodiments can enable dynamic impedance matching between the antenna system and the mobile transceiver based on frequency of operation.

The antennas implemented on, or inside, devices such as handsets and tablets are typically in close proximity of the user's hand, head and other objects such as furniture and other objects which can have a large effect on the complex impedance of the antenna and therefore its impedance match, and therefore the efficiency in delivering power between the antenna system and the transceiver. The impedance match may vary to a substantial degree, e.g., the act of a user picking up a smart phone device may change the impedance match from a Voltage Standing Wave Ratio (VSWR) of 1.2 to over 10, resulting in a large degradation in performance. The exemplary embodiments can provide dynamic impedance matching to identify and/or address these impedance changes.

One embodiment of the subject disclosure is a method including determining, by a processor, a first VSWR and selecting, by the processor, a VSWR circle from among a group of VSWR circles based on the first VSWR. The method can include identifying, by the processor, a group of sets of tuning settings for variable reactance elements of a matching network, where the identifying of the group of sets of tuning settings is based on each set of tuning settings of the group of sets of tuning settings being associated with the VSWR circle. The method can include selecting, by the processor, a set of tuning settings from among the group of sets of tuning settings responsive to a second VSWR determined for the set of tuning settings satisfying a VSWR threshold. The sets of tuning settings can be in various forms, such as capacitor values, bias voltage values to control the capacitor values, inductor values in a switchable setting, or other settings that are usable for adjusting each of the variable reactance elements, for example to enable the total impedance of the matching network to be adjusted. The sets of tuning values can be in different forms, such as sets that include two capacitor values and an inductor value for a matching network including two variable capacitors and a variable inductor. The particular type of tuning settings can be based on the types of variable reactance elements being used in the matching network, as well as the type of control signals being utilized (e.g., bias voltages for BST or varactor capacitors, digital signals for MEMS-controlled or switched controlled elements, etc.).

One embodiment of the subject disclosure includes a communication device having a matching network including variable reactance elements. The communication device can have a controller coupled with the matching network; where the controller performs operations including determining a first VSWR and selecting a VSWR circle from among a group of VSWR circles based on the first VSWR. The controller can identify a group of sets of tuning settings for the variable reactance elements based on each set of tuning settings of the group of sets of tuning settings being associated with the VSWR circle. The controller can select a set of tuning settings from among the group of sets of tuning settings responsive to a second VSWR determined for the set of tuning settings satisfying a VSWR threshold.

One embodiment of the subject disclosure includes a non-transitory computer-readable storage medium having computer instructions which, responsive to being executed by a processor, cause the processor to perform operations including determining a first VSWR and selecting a VSWR circle from among a group of VSWR circles based on the first VSWR. The processor can identify a group of sets of tuning settings for variable reactance elements of a matching network, where the identifying of the group of sets of tuning settings is based on each set of tuning settings of the group of sets of tuning settings being associated with the VSWR circle. The processor can select a set of tuning settings from among the group of sets of tuning settings responsive to a second VSWR determined for the set of tuning settings satisfying a VSWR threshold.

Other embodiments are described by the subject disclosure.

One or more of the exemplary embodiments can utilize matching networks that include variable reactance elements, such as voltage tunable dielectric capacitors, Micro-Electro-Mechanical Systems (MEMS) varactors, semiconductor varactors, MEMS switched reactance component, semiconductor switched reactance component, or combinations thereof. The matching network can be in various configurations and can include various components including fixed and/or variable reactance elements.

As an example, a pi network 100 shown in FIG. 1 can be used to perform impedance matching. Varying the reactance of capacitors C1, C2 and inductor L enables matching a wide range of complex impedances between the RF source, SRC and load. Because of the non-linear nature of the pi network 100, it can be difficult to derive machine instructions that find an impedance match to deliver maximum power to the load in a large range of cases, due to the complex nature of the impedance being matched. Algorithmic methods can become stuck in local maxima or minima, or at times be pushed off to an extreme at which an impedance match is unachievable.

Figure 2:
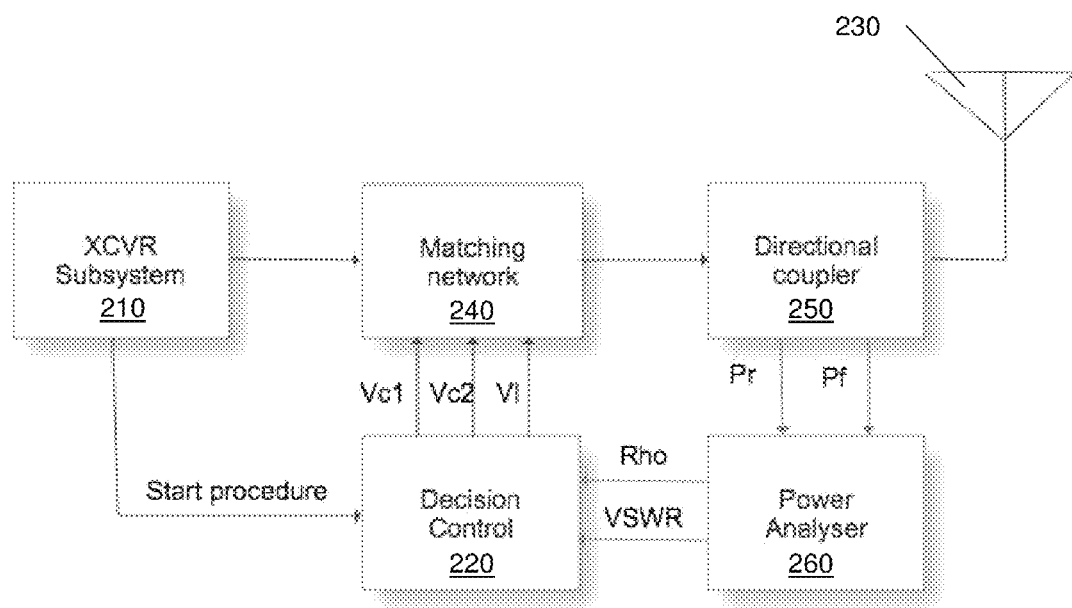
FIGS. 2-3 depict illustrative embodiments of communication devices that can perform impedance matching.

As an example, the impedance matching of the exemplary embodiments can be performed utilizing one or more of the components of communication device 200 of FIG. 2 which includes a transceiver subsystem 210 which notifies the decision control module 220 to start finding an impedance match and supplies RF energy to the antenna system 230 through the matching network 240 (e.g., pi-network 100) via a directional coupler 250. The directional coupler 250 can sample the forward and reverse power, which are sent to the power analyzer 260 which in turn computes reflection coefficient and/or VSWR. The reflection coefficient and/or VSWR can be used by the decision control module 220, which can determine which values to set the voltages (or other control signal) controlling the set of tunable settings, the tuning elements Vc1, Vc2 and V1.

In this example, the directional coupler 250 has the ability to monitor forward and reflected power. However, this component may be replaced by other means of determination of such parameters. As an example, a reflected power detector may be available, but not a forward power detector. In such a case, other techniques can be utilized for obtaining forward power measurements. For example, tuning of the match can be limited to when the transmitter is commanded to output full power. As another example, output power can be estimated based on a known condition(s) such as power control commands from the base station used to control handset transmit power. Knowing both forward and reflected power can facilitate analysis of the potential impact of load-pulling on the final amplifier's gain and output impedance and the impact of power control as commanded by the base station.

Figure 3:
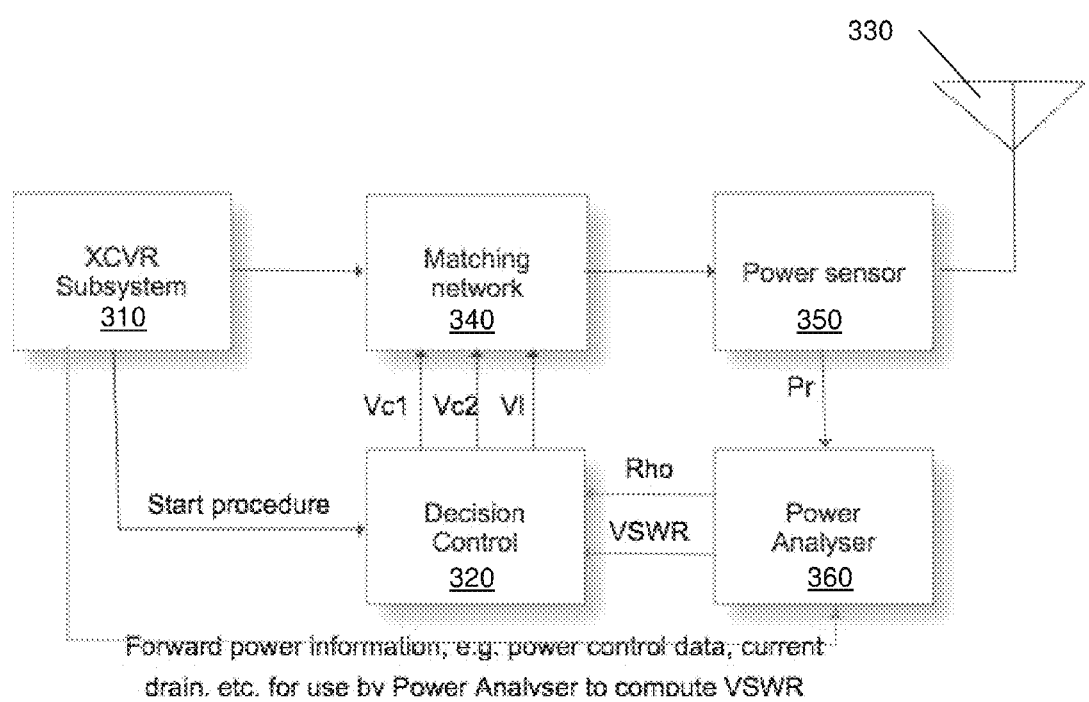

As another example, the impedance matching of the exemplary embodiments can be performed utilizing one or more components of communication device 300 of FIG. 3 whereby the transceiver subsystem 310 informs the power analyzer 360 of forward power information that it may have in the form of transmitter power control data, current drain or other information that may be useful. Communication device 300 can include the matching network 340, power sensor 350, and decision control module 360. Communication device 300 enables accessing and utilizing additional information for gathering forward power information from the transceiver subsystem 310.

Referring back to device 200, in one or more of these examples, the directional coupler 250 can supply a sample of RF power from the transceiver 210 to the antenna system 230 in both forward and reverse directions. The power analyzer 260 can calculate the reflection coefficient, ρ:

$$\rho = \sqrt{\frac{P_R}{P_F}}$$

where ρ=the reflection coefficient, $P_R$=reflected power, and $P_F$=forward power.

The power analyzer 260 may also compute VSWR:

$$VSWR = \frac{1+\rho}{1-\rho}$$

One or both of ρ and VSWR can be used by the decision control module 220 in order to decide what values to which the matching network 240 are to be set in order to achieve a reasonable impedance match between the transceiver 210 and antenna system 230.

The way that the human brain would perform the task of adjusting a pi-network would be similar to the following:
1. Set initial condition of C1, C2 and L to 50% of their range
2. Apply RF power (VSWR=12.2)
3. Adjust L for minimum VSWR by decrementing L (VSWR=4.5)
4. Adjust C1 for minimum VSWR by decrementing C1 (VSWR=3.5)
5. Adjust C2 for minimum VSWR by decrementing C2 (VSWR=2.1)
6. Adjust C1 for minimum VSWR by incrementing C1 (VSWR=1.5)
7. Adjust C2 for minimum VSWR by decrementing C2 (VSWR=1.2)
8. Adjust C1 for minimum VSWR by incrementing C1 (VSWR=<1.1)

While this may be relatively easy for the human brain to perform, this procedure can be complex to perform by computer, and runs the risk of instability. When the human adjusts, e.g., C1 for minimum VSWR, multiple simultaneous nonlinear operations take place. These operations include a) range checking, i.e., knowing that the maximum or minimum element value has been reached, which should be a cue to change the value of another element, b) learning that the direction of element value must be reversed in order to find a minimum and c) knowing that the VSWR target value cannot be reach in some cases.

The following is a computer-controlled, non-linear process for impedance matching. First, a set of definitions would be made:
1. Define tuning element quanta: C1, C2, L–percentage of maximum to minimum value is a reasonable place to begin, e.g. 0-100% with an increment of 1%.
2. Define minimum and maximum element values: as above, Min=0, Max=100
3. Define a predictable starting state, e.g. C1=50, C2=50, L=50
4. Define VSWR target: Because ideal return loss for a perfect match is $$10\log_{10}\left(\frac{P_R}{P_F}\right) = 10\log_{10}(0) = \infty,$$

a target must be defined, which would represent a reasonably ideal condition in the practical domain. The ideal match is equivalent to VSWR level=1. For a handset, a reasonable starting target point would be 1.6.
5. Define a default action to take when boundary conditions are met when the VSWR target is not met, such as what happens when VSWR is decreasing while incrementing C2, but a) VSWR target is not met and b) C2 has been incremented to maximum value. This is an extremely difficult task, but a first approximation might be to return to a predictable state such as the initial condition of L=C1=C2=50%.

Using these definitions, an algorithm may be defined as follows:

```
Set L = C1 = C2 = 50%
If( Vswr <= Vswr_target )
    Return(OK);
For( Vswr_prev = Vswr, try = 0; try < MAX-TRIES &&
Vswr > Vswr_target; try++ )
{
    while( (Vswr_prev = Vswr) && Vswr > Vswr_target) /* Assign
    prev VSWR to current VSWR, check if > target */
    {
        decr(L); /* decrement L */
        if( Vswr > Vswr_prev ) /* if we went too far indicating a
        minimum */
        {
            incr(L); /* decrement L */
            break;
        }
    }
    If( Vswr <= Vswr_target )
        Return(OK);
    while( (Vswr > Vswr_target) /* check if > target */
    {
        if( Vswr > Vswr_prev ) /* if we went too far indicating a
        minimum */
        {
            decr(L); /* go back to the real minimum */
            break;
        }
    }
    If( Vswr <= Vswr_target )
        Return(OK);
    /* Repeat procedure for both C1 and C2 */
    return(TOO_MANY_TRIES);
}
```

The functions "incr( )" and "decr( )" can have bounds checking and take the appropriate action, e.g., setting the element values to initial state if such bounds are met. In experiments with such a solver written as a simulation, based on data from the human-guided experiment, examples converged on the VSWR target after between 3,000 and 4,000 increment/decrement operations. The experiment artificially bounded itself by keeping the input data consistent with those used in the actual human-guided experiment in which it was known a-priori that a match was in fact achievable.

In another example, an automated iterative matching procedure is provided for tuning a matching circuit based on noisy measurements of VSWR. The VSWR is a real function of the tunable elements of matching circuit. Accordingly, a constrained optimization can be employed to find a set of tunable elements that minimizes the VSWR level. Iteratively, a gradient of VSWR computed as the difference associated with variations of tunable elements can be implemented. VSWR minimization can be bound constrained as each tunable element has a fixed variation range. Due to noisy measurements of the VSWR level, there may be many local minima that are not of interest. An automated method can enforce convergence to the global minimum, e.g. by updating the difference increments as the iteration progresses.

As an example, Let x(i) denote the vector of values of tuneable elements of matching circuit at iteration i. An automated matching procedure can be described as a quasi-Newton based iterative optimization algorithm:
1. Input initial values for tuneable components x(1), and step size h
2. For each iteration i=1, . . . , MAX_ITERATION
a. Measure VSWR value v for current setting of tuneable elements x(i)
b. Terminate if v<=VSWR_TARGET
c. Measure vector of VSWR values v' for perturbed tuneable elements x(i)±h
d. Compute vector of first-order partial derivatives g=GradientVSWR (x(i), v, v')
e. Compute matrix of second-order partial derivatives H=HessianVSWR (x(i), v, v')
f. Compute l=LineSearchCoefficient(v, g)
g. Compute d=LinearSolution(H, g)
h. Update x(i+1)=x(i)−l*d In Step 1, the initial set of tuneable components x(1) and step size h can be predetermined based on the variation range of antenna impedance at common use cases of wireless device. The gradient vector g in Step 2d and Hessian matrix H in Step 2e can be computed using elementary arithmetic operations. Steps 2c, 2d, and 2e can be executed simultaneously given an experimental model of the VSWR function. The line search algorithm in Step 2f can be performed offline, and the optimal coefficients can be stored for the admissible ranges of VSWR values and variations. The transition value d can be determined as solution to the linear system of equations Hxd=g, implemented using elementary arithmetic operations.

The convergence rate of the algorithm above depends on the initial conditions. Computations are implemented based on the number and range of tunable elements. The backtracking Step 2f assures that the computed steepest descent direction is valid regardless of the error associated with approximation of gradient and Hessian values. An implementation of the above algorithm is tested for a Pi network with two tunable capacitors and the results are presented as examples herein.

In one or more embodiments, the complexity of the automated impedance matching technique described above can be reduced utilizing tuning settings associated with constant VSWR circles. In one or more embodiments of the following methods, no adjustment to the matching circuit is done before measurements are made. Once measurements are made, a table-based approach can be utilized to control the matching circuit adaptively matching it to the new scenario.

Figure 4:
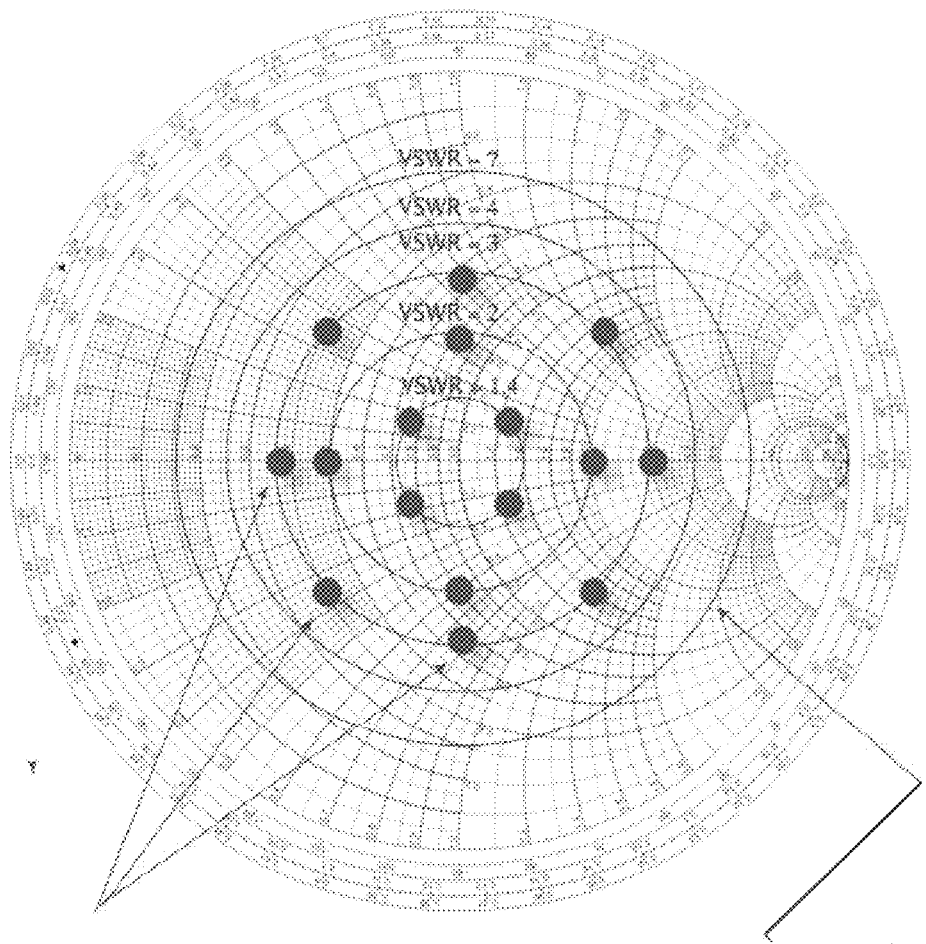
FIG. 4 depicts an illustrative embodiment of a Smith chart depicting constant VSWR circles that can be utilized for impedance matching.

In one embodiment, impedance matching can be performed using reflection coefficient and/or VSWR values. Because some RF amplifier systems are greatly affected by load pulling, i.e., their gain, output impedance and therefore output power vary with varying load impedance, it can be appropriate to use VSWR as the principal metric. This criterion can also make it possible to run a matching algorithm independent of transmit power control. The exemplary methods are based on a property of the relationship between VSWR and complex impedances as viewed on the Smith chart. Referring to Smith chart 400 of FIG. 4, constant VSWR circles are illustrated. Each circle represents a set of complex impedances R+jX, which, in the exemplary embodiments, can be further quantized into sets of values that match the R+jX around the circle as closely as possible or desired to 1+j0. Searching this data structure can involve the following:
1. Measure VSWR
2. Search Constant VSWR circles to nearest circle quantum
3. Search specific Constant VSWR circle to quantized tuning values that produce best match.

Smith chart 400 illustrates constant VSWR circles and element reactance values to match a given R+jX as closely as possible or desired to 1+j0, as is implemented in the exemplary embodiments. Searching a data structure representing these values can be both rapid and bounded. The number and value of Constant VSWR circles can be selected based on worst case situations in real world situations and may be optimized or otherwise improved to produce reasonable results with minimum computation. Tuning values around each circle may be as coarsely or finely quantized as desired or needed. In this embodiment, tuning-range ending boundaries do not exist, as there would be a finite number of choices available.

Figure 5:
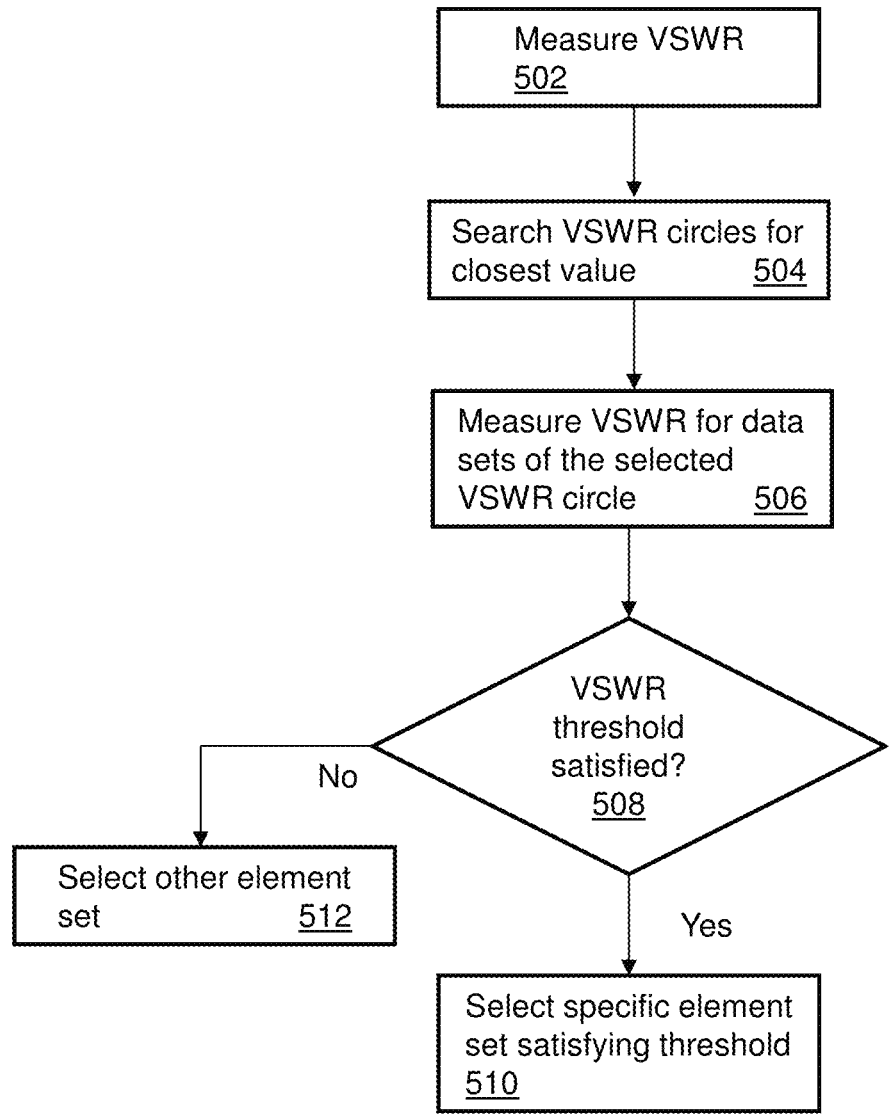
FIG. 5 depicts an exemplary method that can be used for performing impedance matching utilizing tuning settings associated with VSWR circles.

An exemplary method 500 for determining tuning settings based on the constant VSWR circles is illustrated in FIG. 5. At 502, VSWR can be measured for a communication device (e.g., based on reflected and forward power). At 504, VSWR circles can be searched for data structure containing the closest VSWR value. For instance, this data can be stored in a look-up table. At 506, VSWR circle element data for the previously identified VSWR circle can be searched, and VSWR measurements made for element sets. At 508, if the measured VSWR for the specific element set satisfies a threshold (e.g., less than or equal to a target VSWR which can be predetermined or dynamically determined) then the tuning settings are selected at 510. The particular threshold utilized can be based on a number of factors, including the capabilities of the communication device, the requirements of the network, the radio access technology being used, and so forth. If on the other hand, none of the element sets satisfy the threshold, then an alternative tuning set can be selected. For example, all quanta in the selected VSWR circle can be searched and the element set having the least VSWR value can be selected, or element values previously determined for minimum VSWR for mobile device in free-space can be selected.

Method 500 can reduce processing complexity significantly, eliminate the boundary problems of a loop-based algorithm and address what to do if a solution is not found for some reason. Non-linear artifacts associated with step sizes for reactive tuning elements can also be eliminated, because in an actual loop-based matching network, having a fixed value of 1% may be sub-optimal, and may not be appropriate under certain conditions. There are cases in which a 5% step would be more appropriate and others, even for matching the same complex load impedance, where 0.5% would be appropriate.

Figure 6:
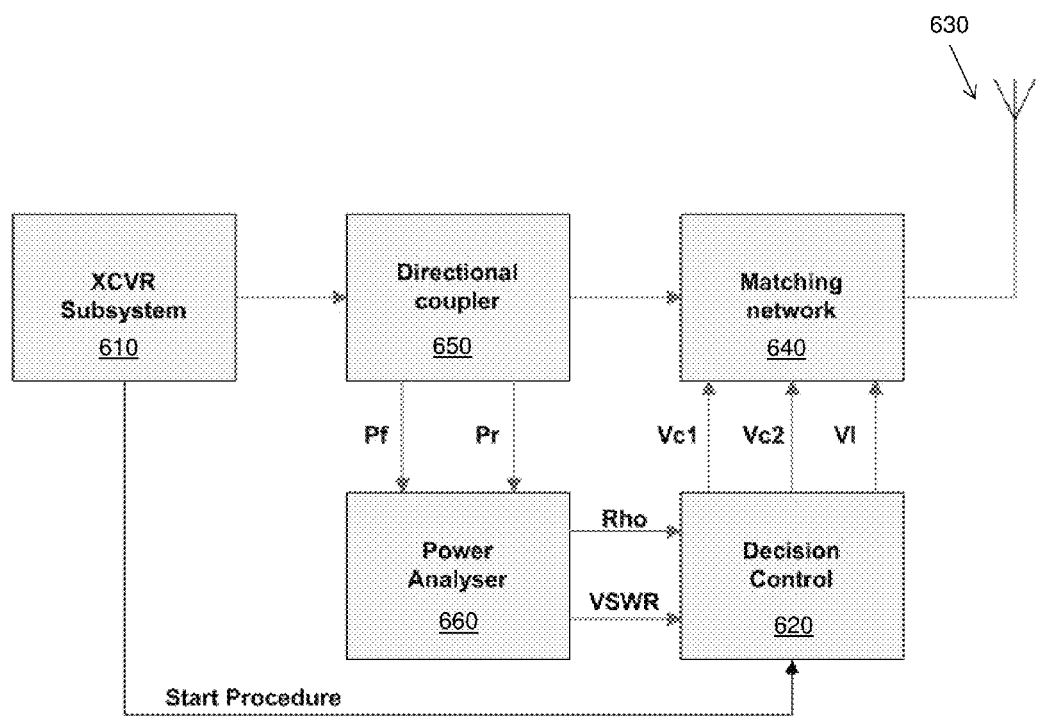
FIGS. 6-7 depict illustrative embodiments of communication devices that can perform impedance matching.
Figure 7:
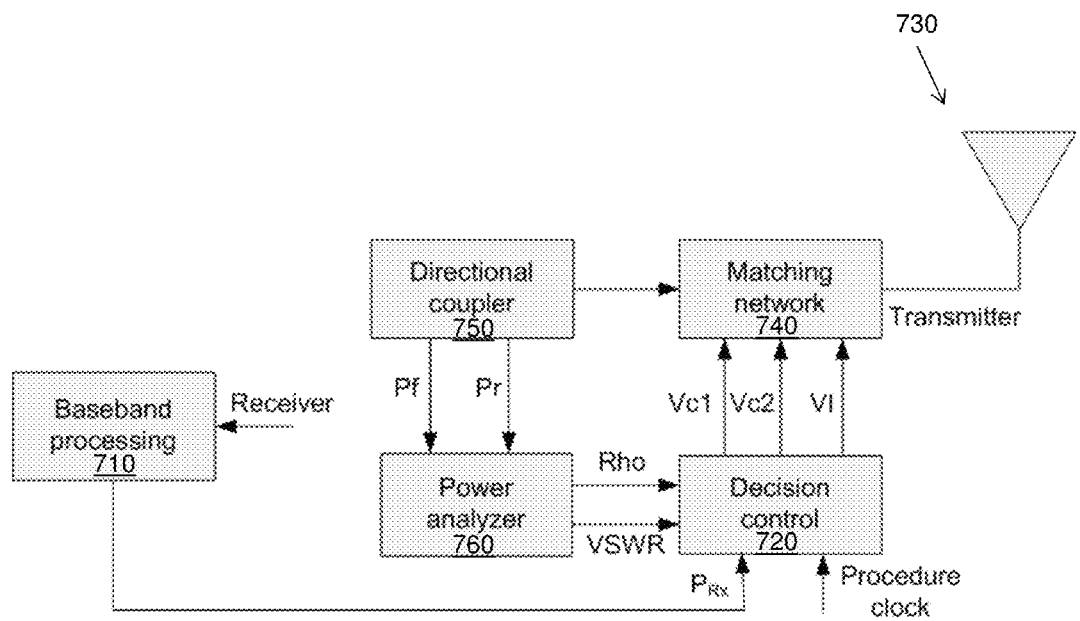

In another embodiment, constant VSWR circles can be utilized for impedance matching where the VSWR is not directly calculated. For instance, impedance matching can be performed in a communication device 600 illustrated in FIG. 6 which includes a transceiver 610, a decision control module 620, an antenna system 630, a matching network 640, a directional coupler 650 and a power analyzer 660.

The method employed by device 600 can differ from method 500 in that VSWR may not be explicitly computed but rather a value can be pulled from a table based on a quantized reflected power Pf value. This can be useful in systems that may only have a reflected power measurement available. If a forward power measurement is available, this method can still be utilized. For example, the forward power measurement can be used to verify that the TX power amplifier is not being load pulled. This means if the forward power doesn't change more than some prescribed amount or threshold then it is determined that the amplifier is not being load pulled. For systems that do not have a Pf measurement available, secondary approaches, such as utilizing amplifier current, can be used. Additionally, in some system designs it may be known a priori that that the tuning range of the matching network and antenna system cannot load pull the TX amplifier. If the TX forward power is constant during the matching process then the VSWR can be a direct map from the Pr measurement. In one embodiment, a table containing the quantized VSWR values can be used. For instance, the quantized Pr values can be in the index of the table. When the VSWR value is determined, the method can proceed as follows: 1. Obtain VSWR from table as indexed by Pr; 2. Search VSWR circles for data structure containing closest VSWR value; 3. Search VSWR circle element data, obtaining VSWR for each element set via table; 4. IF obtained VSWR with specific element set is less than or equal to VSWR_Target, then STOP; 5. ELSE search all quanta in selected VSWR circle and select element set having least VSWR value OR load element values previously determined for minimum VSWR for mobile device in free-space. In one or more embodiments, the method can include selecting another set of tuning settings from among the group of sets of tuning settings responsive to a third VSWR determined for the other set of tuning settings being a lowest VSWR determined for the group of sets of tuning settings, wherein the second VSWR determined for each of the group of sets of tuning settings fails to satisfy the VSWR threshold. In one or more embodiments, the method can include selecting a default set of tuning settings responsive to the second VSWR determined for each of the group of sets of tuning settings failing to satisfy the VSWR threshold, wherein the default set of tuning settings is based on impedance matching for a communication device in free space.

In one or more embodiments, the received and reflected powers can be utilized as part of the impedance matching process, including in conjunction with any of the methods described above. For instance, in technologies such as LTE, there is the advantage of a having measurements available in a both the up-link (UL) and the downlink (DL) simultaneously as well as having these measurements within a broadband. With this, the received power at baseband and the reflected power measured at RF, for the most part, can be available and can be used in dynamically matching the antenna using a pre-defined table of data.

Figure 8:
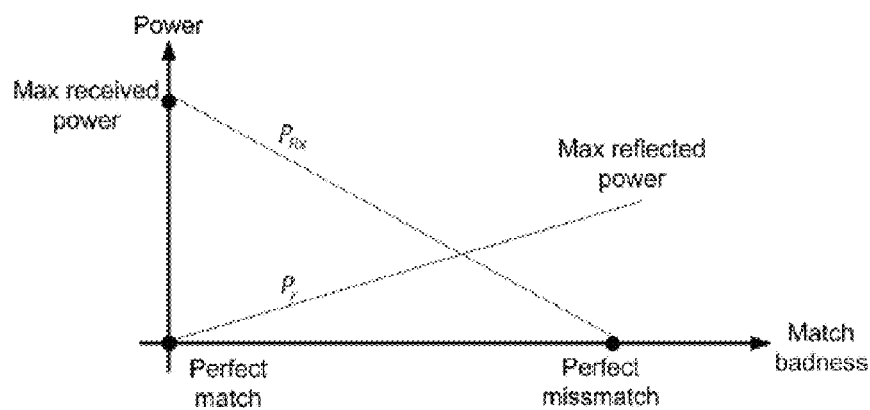
FIG. 8 depicts an exemplary graph depicting power versus matching for one or more of the exemplary embodiments of impedance matching.

In one or more embodiments, communication device 700 can be utilized for performing impedance matching in conjunction with the received and reflected powers. Communication device 700 can include a baseband processor 710, a decision control module 720, an antenna system 730, a matching network 740, a directional coupler 750 and a power analyzer 760. Communication device 700 provides the advantage of having an extra degree of freedom from information at the DL along the UL. FIG. 8 illustrates the relationship between the information on the UL and on the UL as a function of the accuracy of the match. Reflected power on the UL and the received power on the DL have reverse behaviors. In one or more embodiments, scenarios where the reflected power measures low as a result of low transmitted power and not due to good matching state can be identified. For instance, the received power can be examined and if it measures high then we would know that the low reflected power measure is indeed due to the good match. If the received power measures low then it can be determined that the level of the reflected power is not being sensed accurately. In another embodiment, the received power can be sampled at different frequencies within the broadband of measurements. Different samples can be used to verify the state of the handset. When a large variation is seen in the DL power across the band of measurements then the exemplary method can detect that the usage mode (e.g., use case) has changed which may trigger a new match.

In one or more embodiments, in scenarios where the change in the usage mode is minor, for example the user is still in the data mode but has changed the positions of one or two fingers, then an averaging approach on the DL RSSI powers can be done along with the one sample of reflected power and the match would be decided based on this new data set.

The range of change in the reflection coefficient is 0-1 and in the reflected power after detection is also narrow. The range of the received power can be −70 to −110 dBm, i.e., about 40 dBm in range. This can give a better resolution to build a table of pre-defined matched states.

Figure 9:
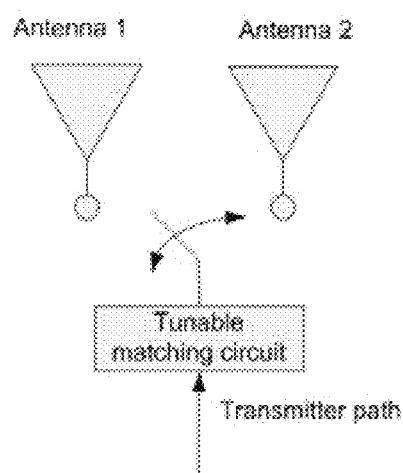
FIG. 9 depicts an illustrative embodiment of a multi-antenna communication device that can perform impedance matching.

In LTE communications, both antennas can be active on the DL. With simultaneous DL power measurements (RSSI), the environment surrounding each antenna can be determined or otherwise inferred. For diversity applications, such as antenna selection on the UL, the chosen antenna can be matched based on its received power information, such as shown in system 900 of FIG. 9. This can also be seen as a pre-MIMO scenario.

Examples

Figure 10:
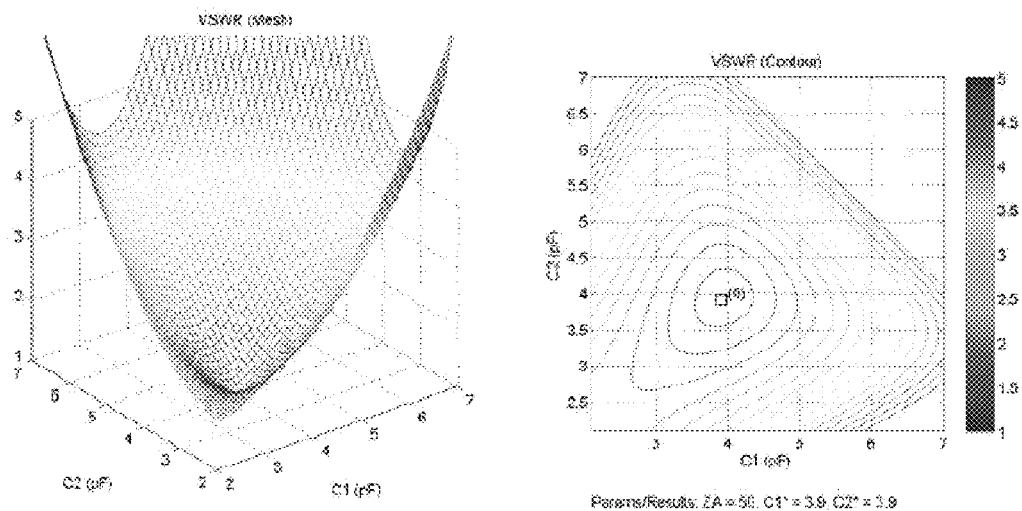
FIGS. 10-13 illustrate VSWR graphs for one or more of the exemplary embodiments of impedance matching.

For the examples, the Pi matching network 100 in FIG. 1 can be utilized with a fixed inductor L=3.3 nH, and tunable capacitors C1 and C2 with capacitance range of [2 pF,7 pF]. FIG. 10 depicts the mesh and contour graphs of VSWR level at operating frequency f=1.8 GHz for different values of C1 and C2 (in 0.1 pF increments) and nominal antenna impedance ZA=50. For the discrete set of capacitance values graphed in FIG. 10, the minimum VSWR level (=1.03) is obtained at $C1^*=C2^*=3.9$ pF. Accordingly, $x(0)=[3.9$ pF, $3.9$ pF$]$ can denote the initial values of tunable components of the matching circuit as shown with a black square in the contour graph.

Figure 11:
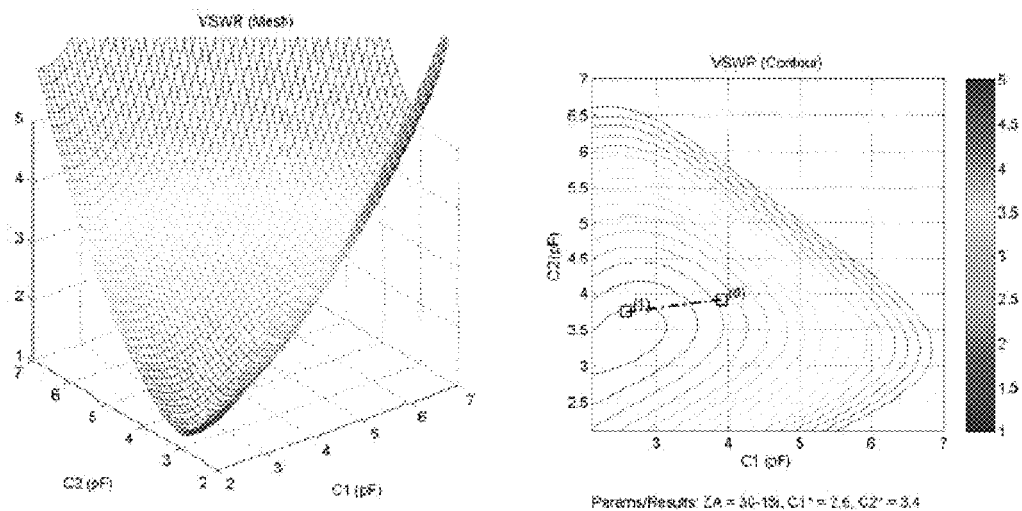

In one example, a case is illustrated where there is a capacitive antenna impedance. FIG. 11 depicts the results of tuning the capacitors according to the automated matching procedure when the antenna impedance is changed to ZA=30−j15. As demonstrated in the contour graph in FIG. 8 and the table below, the desired VSWR value (<1.6) is obtained in one iteration:

| Iteration | $C_1(pF)$ | $C_2(pF)$ | VSWR |
|---|---|---|---|
| 0 | 3.90 | 3.90 | 1.82 |
| 1 | 2.58 | 3.74 | 1.21 |

Figure 12:
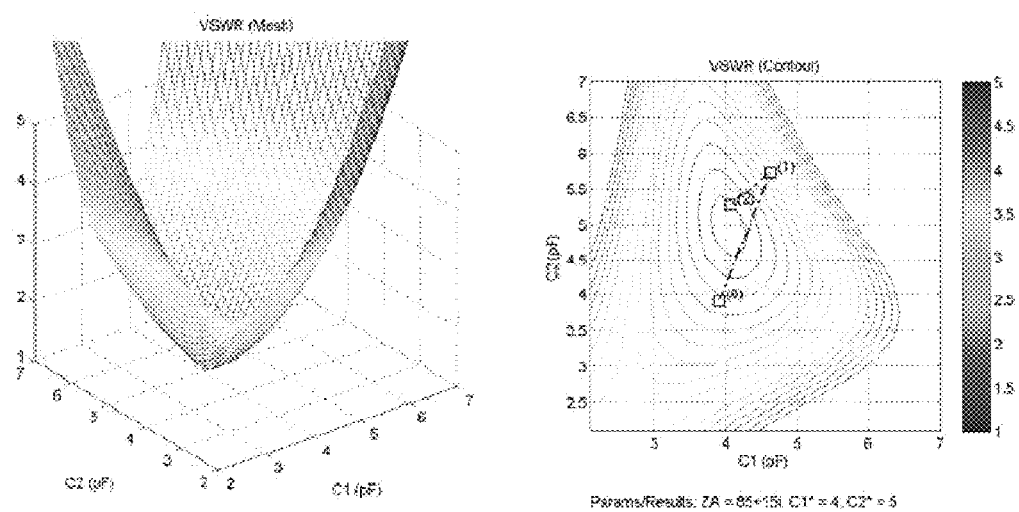

In another example, a case is illustrated where there is an inductive antenna impedance. FIG. 12 depicts the results of tuning the capacitors according to the automated matching procedure when the antenna impedance is changed to ZA=85+j15. As demonstrated in the contour graph in FIG. 12 and the table below, the desired VSWR value (<1.6) is obtained in two iterations:

| Iteration | $C_1(pF)$ | $C_2(pF)$ | VSWR |
|---|---|---|---|
| 0 | 3.90 | 3.90 | 1.84 |
| 1 | 4.61 | 5.72 | 2.59 |
| 2 | 4.06 | 5.27 | 1.21 |

Figure 13:
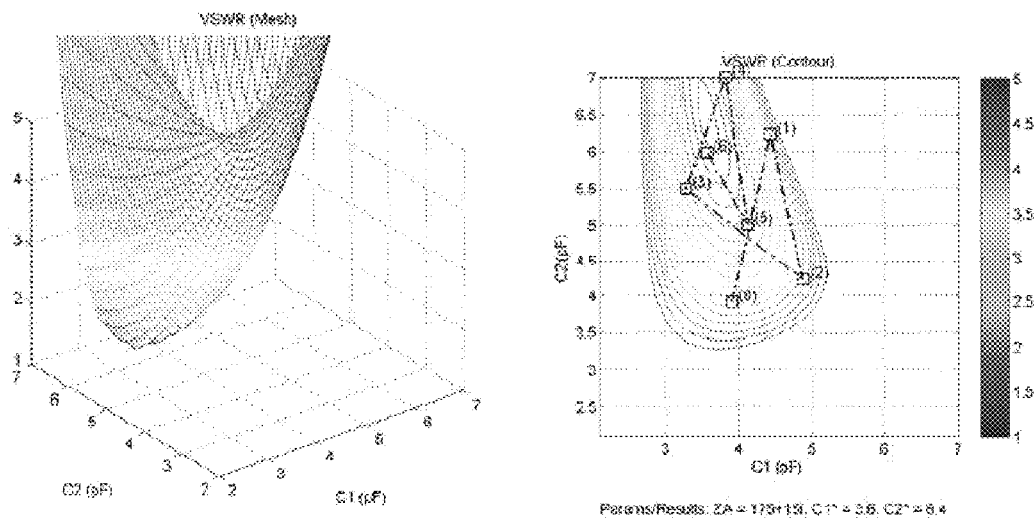

In another example, a case is illustrated where there is an extreme mismatch. FIG. 13 depicts the results of tuning the capacitors according to the automated matching procedure when the antenna impedance is changed to ZA=175+j15. The desired VSWR value (<1.6) is obtained in six iterations:

| Iteration | $C_1(pF)$ | $C_2(pF)$ | VSWR |
|---|---|---|---|
| 0 | 3.90 | 3.90 | 3.63 |
| 1 | 4.43 | 6.22 | 4.14 |
| 2 | 4.87 | 4.22 | 4.12 |
| 3 | 3.27 | 5.49 | 2.43 |
| 4 | 3.82 | 7.00 | 2.18 |
| 5 | 4.11 | 5.00 | 2.11 |
| 6 | 3.56 | 5.98 | 1.33 |

Figure 14:
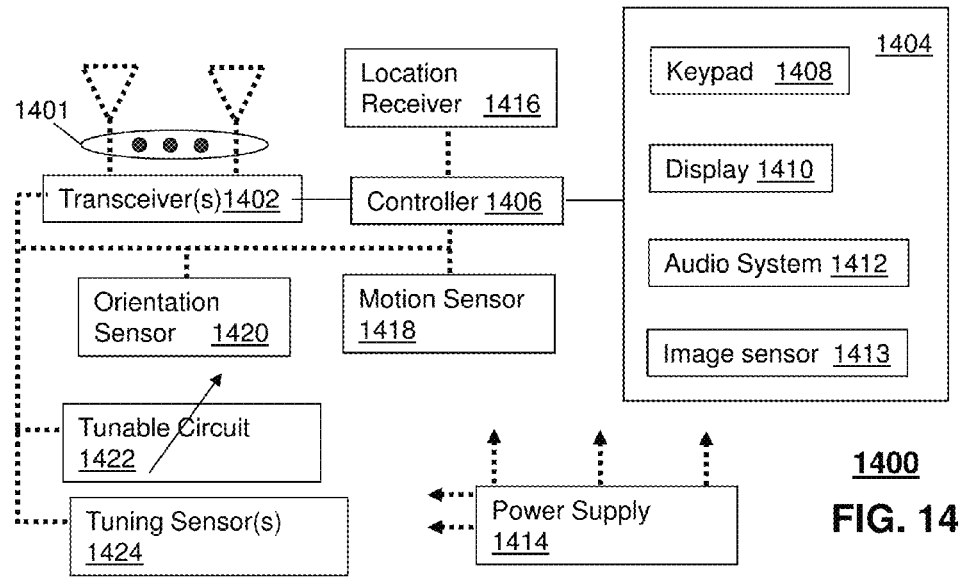
FIG. 14 depicts an illustrative embodiment of a communication device.

FIG. 14 depicts an illustrative embodiment of a communication device 1400 that can implement the dynamic impedance matching based on tuning settings determined from constant VSWR circles as described in method 500, as well as described in the other exemplary embodiments herein. The communication device 1400 can comprise one or more transceivers 1402 coupled to one or more antennas 1401, each transceiver having transmitter and receiver sections (herein transceiver 1402 or transceivers 1402), a tunable circuit 1422, one or more tuning sensors 1424, a user interface (UI) 1404, a power supply 1414, a location receiver 1416, a motion sensor 1418, an orientation sensor 1420, and a controller 1406 for managing operations thereof. The transceiver 1402 can support short-range and/or long-range wireless access technologies such as Bluetooth, ZigBee, Wireless Fidelity (WiFi), Digital Enhance Cordless Telecommunications (DECT), or cellular communication technologies, just to mention a few.

Cellular technologies can include, for example, Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), as well as other next generation wireless communication technologies as they arise. The transceiver 102 can also be adapted to support circuit-switched wireline access technologies such as Public Switched Telephone Network (PSTN), packet-switched wireline access technologies such as TCP/IP, Voice over IP-VoIP, etc., or combinations thereof.

The tunable circuit 1422 can comprise any number of variable reactive elements such as variable capacitors, variable inductors, or combinations thereof that are tunable with digital and/or analog bias signals. The tunable circuit 1422 can include other reactive elements, such as fixed reactive elements, including capacitors and inductors. The tunable circuit 1422 can represent a tunable matching network coupled to the antenna 1401 to compensate for a change in impedance of the antenna 1401, a compensation circuit to compensate for mutual coupling in a multi-antenna system, an amplifier tuning circuit to control operations of an amplifier of the transceiver 1402, a filter tuning circuit to alter a pass band of a filter used by the transceiver 1402, and so on. In one or more embodiments, the tunable circuit can be adjusted using tuning settings that are selected from a table where those tuning settings are associated with a VSWR circle and where a resulting VSWR calculation for the particular tuning setting is compared to a VSWR threshold to determine if the tuning setting is to be utilized or if another tuning setting associated with the VSWR circular is to be analyzed.

Figure 15:
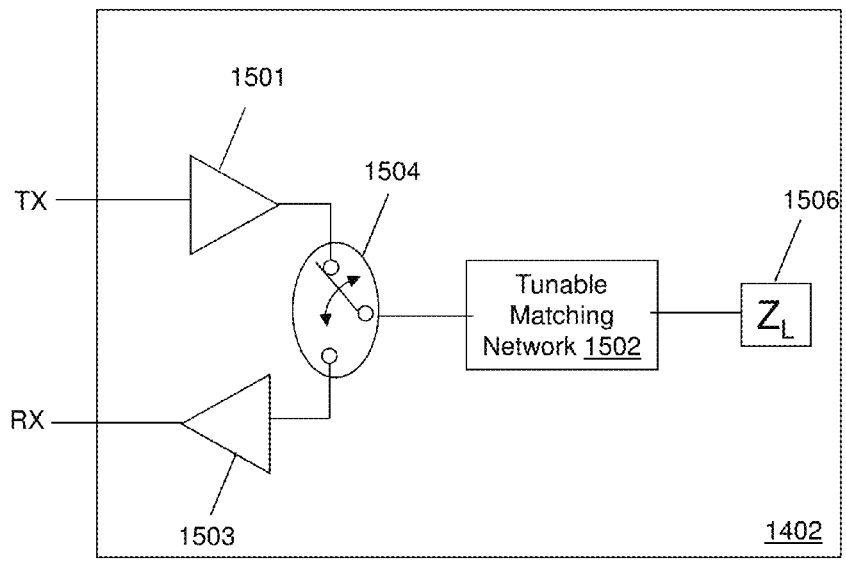
FIG. 15 depicts an illustrative embodiment of a portion of a transceiver of the communication device of FIG. 14.

The tuning sensors 1424 can be placed at any stage of the transceiver 1402 such as, for example, before or after a matching network 1502, and/or at a power amplifier 1501 as shown in FIG. 15. The tuning sensors 1424 can utilize any suitable sensing technology such as directional couplers, voltage dividers, or other sensing technologies to measure signals at any stage of the transceiver 1402. The digital samples of the measured signals can be provided to the controller 1406 by way of analog-to-digital converters included in the tuning sensors 1424. Data provided to the controller 1406 by the tuning sensors 1424 can be used to measure, for example, transmit power, transmitter efficiency, receiver sensitivity, power consumption of the communication device 1400, frequency band selectivity by adjusting filter passbands, linearity and efficiency of power amplifiers, specific absorption rate (SAR) requirements, and so on. The particular type of tuning sensors 1424 and their configuration in the communication device 1400 can depend on the parameters that are being gathered, such as utilizing a directional coupler positioned between the matching network 1502 and the antenna 1506 (in FIG. 15) where forward and reverse power is to be sampled and monitored. The controller 1406 can be configured to execute one or more tuning algorithms, such as based on constant VSWR circles as described in method 500, to determine desired tuning states of the tunable circuit 1422 based on the foregoing measurements.

The UI 1404 can include a depressible or touch-sensitive keypad 1408 with a navigation mechanism. The UI 1404 can further include a display 1410 such as monochrome or color LCD (Liquid Crystal Display), OLED (Organic Light Emitting Diode) or other suitable display technology for conveying images to an end user of the communication device 1400. The UI 1404 can also include an audio system 1412 that utilizes audio technology for conveying low volume audio (such as audio heard in proximity of a human ear) and high volume audio (such as speakerphone for hands free operation). The UI 1404 can further include an image sensor 1413 such as a charged coupled device (CCD) camera for capturing still or moving images. The power supply 1414 can utilize common power management technologies such as replaceable and rechargeable batteries, supply regulation technologies, and/or charging system technologies for supplying energy to the components of the communication device 1400 to facilitate long-range or short-range portable applications.

The location receiver 1416 can utilize location technology such as a global positioning system (GPS) receiver. The motion sensor 1418 can utilize motion sensing technology such as an accelerometer, a gyroscope, or other suitable motion sensing technology to detect motion of the communication device 1400 in three-dimensional space. The orientation sensor 1420 can utilize orientation sensing technology such as a magnetometer to detect the orientation of the communication device 1400 (north, south, west, and east, as well as combined orientations in degrees, minutes, or other suitable orientation metrics). The communication device 1400 can use the transceiver 1402 to also determine a proximity to or distance to cellular, WiFi, Bluetooth, or other wireless access points by sensing techniques such as utilizing a received signal strength indicator (RSSI) and/or signal time of arrival (TOA) or time of flight (TOF) measurements.

The controller 1406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1400.

Other components not shown in FIG. 14 can be used by the subject disclosure. The communication device 1400 can include a slot for inserting or removing an identity module such as a Subscriber Identity Module (SIM) card. SIM cards can be used for identifying and registering for subscriber services, executing computer programs, storing subscriber data, and so forth.

FIG. 15 depicts an illustrative embodiment of a portion of the wireless transceiver 1402 of the communication device 1400 of FIG. 14. In one embodiment, the transmit and receive portions of the transceiver 1402 can include amplifiers 1501, 1503 coupled to a tunable matching network 1502 that is in turn coupled to an impedance load 1506. The impedance load 1506 in the present illustration can be an antenna as shown in FIG. 14 (herein antenna 1506). A transmit signal in the form of a radio frequency (RF) signal (TX) can be directed to the amplifier 1501 which amplifies the signal and directs the amplified signal to the antenna 1506 by way of the tunable matching network 1502 when switch 1504 is enabled for a transmission session. The receive portion of the transceiver 1402 can utilize a pre-amplifier 1503 which amplifies signals received from the antenna 1506 by way of the tunable matching network 1502 when switch 1504 is enabled for a receive session. Other configurations of FIG. 15 are possible for other types of cellular access technologies such as CDMA, UMTS, LTE, and so forth. These undisclosed configurations are applicable to the subject disclosure.

Figure 16:
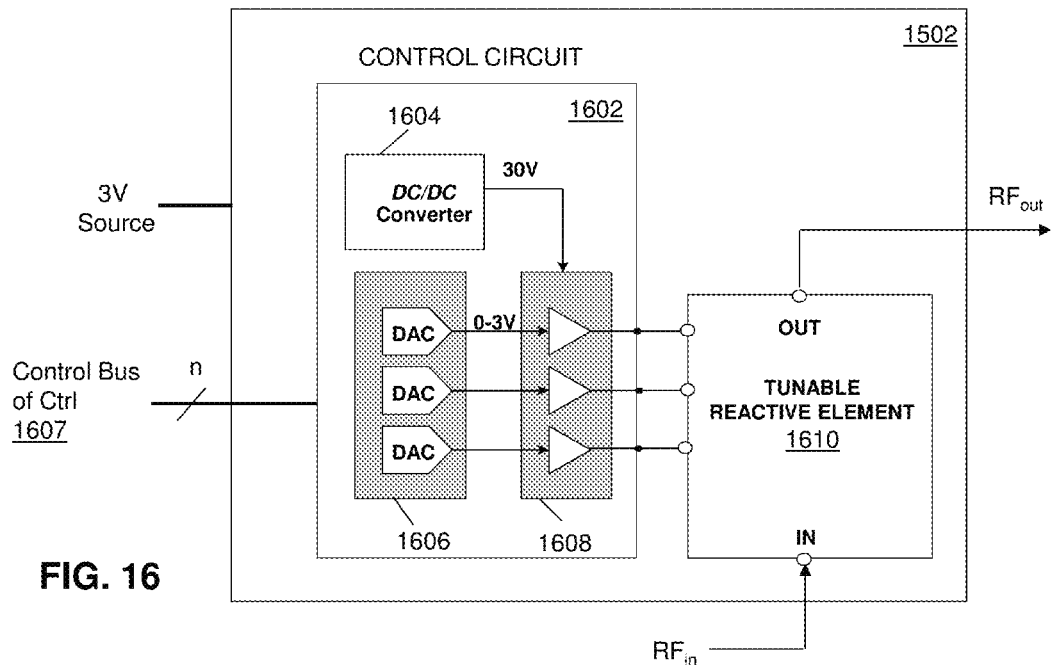
FIGS. 16-19 depict illustrative embodiments of a tunable matching network of the transceiver of FIG. 15.
Figure 17:
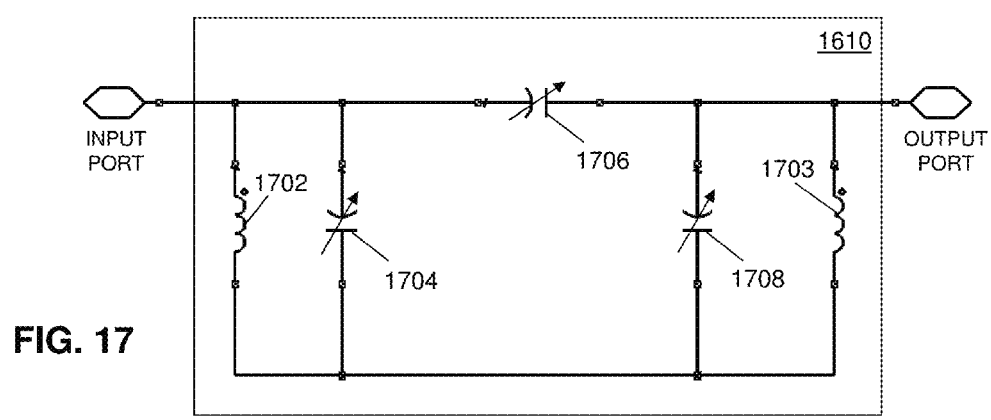

FIGS. 16-17 depict illustrative embodiments of an example of the tunable matching network 1402 of the transceiver 1402 of FIG. 15. In one embodiment, the tunable matching network 1502 can include a control circuit 1602 and a tunable reactive element 1610. The control circuit 1602 can comprise a DC-to-DC converter 1604, one or more digital to analog converters (DACs) 1606 and one or more corresponding buffers 1608 to amplify the voltage generated by each DAC. The amplified signal can be fed to one or more tunable reactive components 1704, 1706 and 1708 such as shown in FIG. 17, which depicts a possible circuit configuration for the tunable reactive element 1610. In this illustration, the tunable reactive element 1610 includes three tunable capacitors 1704-1708 and two inductors 1702-1703 with a fixed inductance. Circuit configurations such as "Tee", "Pi", and "L" configurations for a matching circuit are also suitable configurations that can be used in the subject disclosure.

The tunable capacitors 1704-1708 can each utilize technology that enables tunability of the reactance of the component. One embodiment of the tunable capacitors 1704-1708 can utilize voltage or current tunable dielectric materials. The tunable dielectric materials can utilize, among other things, a composition of barium strontium titanate (BST). In another embodiment, the tunable reactive element 1710 can utilize semiconductor varactors, or MEMS technology capable of mechanically varying the dielectric constant of a capacitor. Other present or next generation methods or material compositions that result in a voltage or current tunable reactive element are applicable to the subject disclosure for use by the tunable reactive element 1610 of FIG. 16.

The DC-to-DC converter 1604 can receive a DC signal such as 3 volts from the power supply 1414 of the communication device 1400 in FIG. 14. The DC-to-DC converter 1604 can use technology to amplify a DC signal to a higher range (e.g., 30 volts) such as shown. The controller 1406 can supply digital signals to each of the DACs 1606 by way of a control bus 1607 of "n" or more wires or traces to individually control the capacitance of tunable capacitors 1604-1608, thereby varying the collective reactive impedance of the tunable matching network 1502. The control bus 1607 can be implemented with a two-wire serial bus technology such as a Serial Peripheral Interface (SPI) bus (referred to herein as SPI bus 1607). With an SPI bus 1607, the controller 1406 can transmit serialized digital signals to configure each DAC in FIG. 16. The control circuit 1602 of FIG. 16 can utilize digital state machine logic to implement the SPI bus 1607, which can direct digital signals supplied by the controller 1406 to the DACs to control the analog output of each DAC, which is then amplified by buffers 1608. In one embodiment, the control circuit 1602 can be a stand-alone component coupled to the tunable reactive element 1610. In another embodiment, the control circuit 1602 can be integrated in whole or in part with another device such as the controller 1406. As described above, the exemplary impedance matching techniques (e.g., method 500) reduce the number of instructions that must be generated and processed by removing the complexity of the iterative matching process. By measuring VSWR for the device 1400, identifying a VSWR circle from among a group of VAWR circles based on the measured VSWR, and then identifying a set of tuning settings that correspond to the identified VSWR circle and which satisfy a VSWR threshold (or which is the lowest VSWR of the sets), the exemplary embodiments can eliminate the complexity of the matching process and conserve resources of the control circuit 1602.

Although the tunable reactive element 1610 is shown in a unidirectional fashion with an RF input and RF output, the RF signal direction is illustrative and can be interchanged. Additionally, either port of the tunable reactive element 1610 can be connected to a feed point of the antenna 1506, a structural element of the antenna 1506 in an on-antenna configuration, or between antennas for compensating mutual coupling when diversity antennas are used, or when antennas of differing wireless access technologies are physically in close proximity to each other and thereby are susceptible to mutual coupling. The tunable reactive element 1610 can also be connected to other circuit components of a transmitter or a receiver section such as filters, amplifiers, and so on, to control operations thereof.

Figure 18:
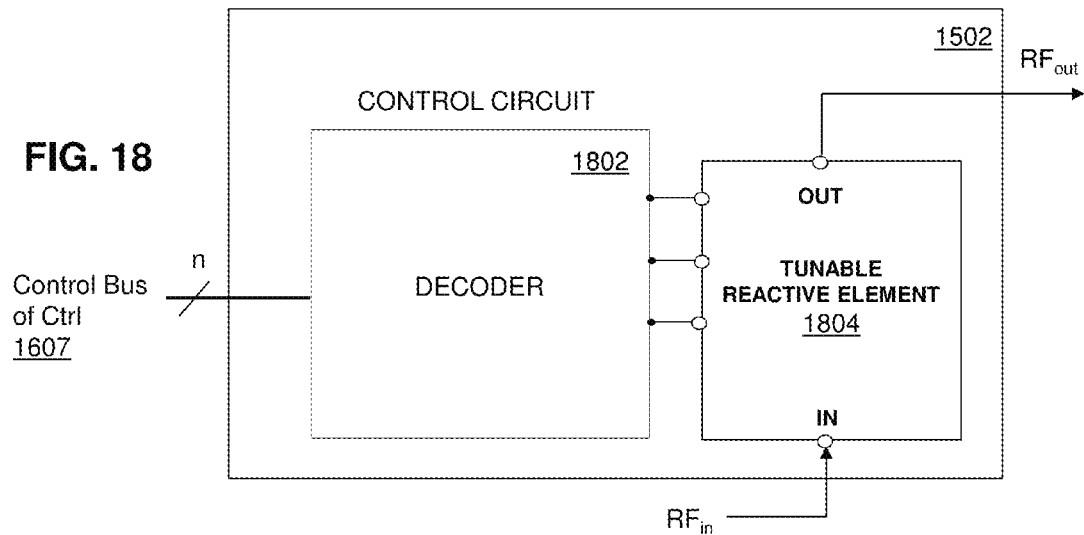
Figure 19:
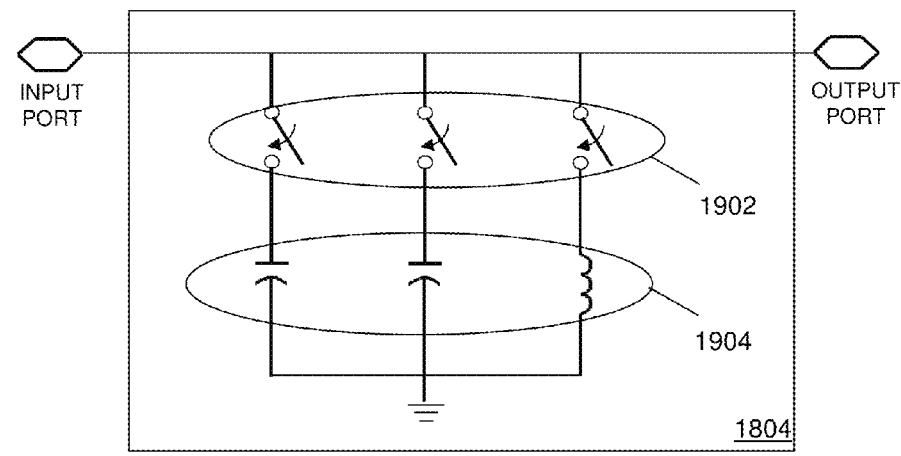

In another embodiment, the tunable matching network 1502 of FIG. 15 can comprise a control circuit 1802 in the form of a decoder and a tunable reactive element 1804 comprising switchable reactive elements such as shown in FIGS. 18-19. In this embodiment, the controller 1406 can supply the control circuit 1802 signals via the SPI bus 1607, which can be decoded with Boolean or state machine logic to individually enable or disable the switching elements 1902. The switching elements 1902 can be implemented with semiconductor switches, MEMS, or other suitable switching technology. By independently enabling and disabling the reactive elements 1904 (capacitor or inductor) of FIG. 19 with the switching elements 1902, the collective reactive impedance of the tunable reactive element 1804 can be varied by the controller 1406.

The tunable reactive elements 1610 and 1804 of FIGS. 16 and 18, respectively, can be used with various circuit components of the transceiver 1402 to enable the controller 1406 to manage performance factors such as, for example, but not limited to, transmit power, transmitter efficiency, receiver sensitivity, power consumption of the communication device 1400, frequency band selectivity by adjusting filter passbands, linearity and efficiency of power amplifiers, SAR requirements, among other operational parameters.

FIG. 20 depicts an illustration of a look-up table 2000 stored in memory, which can be indexed by the controller 1406 of the communication device 1400 of FIG. 14 according to various criteria, such as reflected power, physical and/or functional use cases of the communication device 1400, operating frequencies, and so forth. In one embodiment, table 2000 can include sets of tuning settings (e.g., a tuning state) for the variable reactance elements of a matching network, where the sets are derived from VSWR measurements and are correspond to constant VSWR circles.

Figure 21:
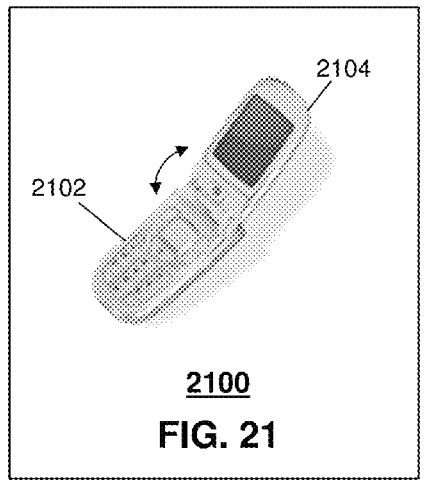
FIGS. 21-24 depict illustrative physical and operational use cases of a communication device.

A physical use case can represent a physical state of the communication device 1400, while a functional use case can represent an operational state of the communication device 1400. For example, for a flip phone 2100 of FIG. 21, an open flip can represent one physical use case, while a closed flip can represent another physical use case. In a closed flip state (i.e., bottom and top flips 2102-2104 are aligned), a user is likely to have his/her hands surrounding the top flip 2102 and the bottom flip 2104 while holding the phone 2100, which can result in one range of load impedances experienced by an internal or retrievable antenna (not shown) of the phone 2100. The range of load impedances of the internal or retrievable antenna can be determined by empirical analysis.

With the flip open a user is likely to hold the bottom flip 2102 with one hand while positioning the top flip 2104 near the user's ear when an audio system of the phone 2100, such audio system 1412 of FIG. 14, is set to low volume, and voice channel is active. If, on the other hand, the audio system 1412 is in speakerphone mode, it is likely that the user is positioning the top flip 2104 away from the user's ear. In these arrangements, different ranges of load impedances can be experienced by the internal or retrievable antenna, which can be analyzed empirically. The low and high volume states of the audio system 1412, as well as, a determination that a voice channel is active illustrates varying functional use cases.

Figure 22:
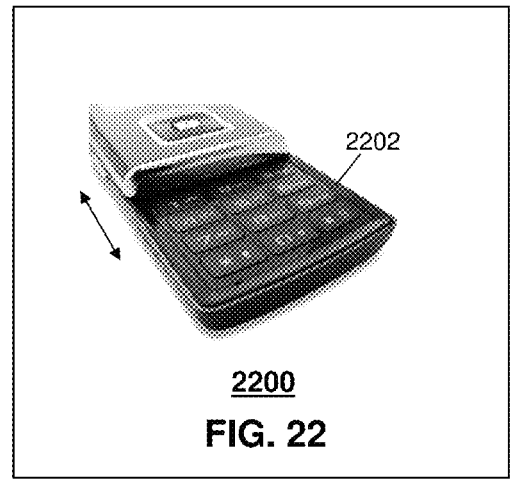
Figure 23:
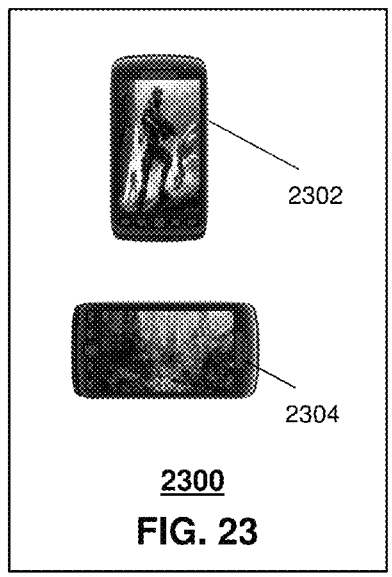
Figure 24:
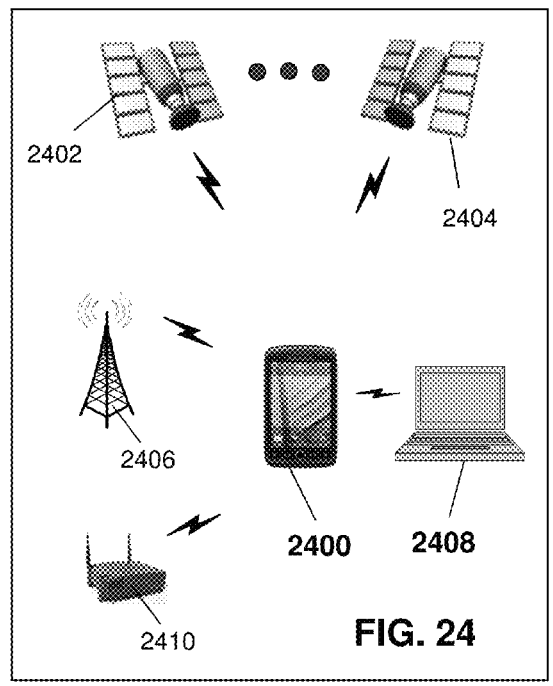

For a phone 2200 with a slideable keypad 2204 (illustrated in FIG. 22), the keypad in an outward position can present one range of load impedances of an internal antenna, while the keypad in a hidden position can present another range of load impedances, each of which can be analyzed empirically. For a smartphone 2300 (illustrated in FIG. 23) presenting a video game, an assumption can be made that the user is likely to hold the phone away from the user's ear in order to view the game. Placing the smartphone 2300 in a portrait position 2302 can represent one physical and operational use case, while utilizing the smartphone 2300 in a landscape position 2304 presents another physical and operational use case.

The number of hands and fingers used in the portrait mode may be determined by the particular type of game being played by the user. For example, a particular video game may require a user interface where a single finger in portrait mode may be sufficient for controlling the game. In this scenario, it may be assumed that the user is holding the smartphone 2300 in one hand in portrait mode and using a finger with the other. By empirical analysis, a possible range of impedances of the internal antenna(s) of the communication device can be determined when using the video game in portrait mode. Similarly, if the video game selected has a user interface that is known to require two hands in landscape mode, another estimated range of impedances of the internal antenna can be determined empirically.

A multimode phone 2400 capable of facilitating multiple access technologies such as GSM, CDMA, LTE, WiFi, GPS, and/or Bluetooth in two or more combinations can provide additional insight into possible ranges of impedances experienced by two or more internal antennas of the multimode phone 2400. For example, a multimode phone 2400 that provides GPS services by processing signals received from a constellation of satellites 2402, 2404 can be empirically analyzed when other access technologies are also in use. Suppose, for instance, that while navigation services are enabled, the multimode phone 2400 is facilitating voice communications by exchanging wireless messages with a cellular base station 2406. In this state, an internal antenna of the GPS receiver may be affected by a use case of a user holding the multimode phone 2400 (e.g., near the user's ear or away from the user's ear). The effect on the GPS receiver antenna and the GSM antenna by the user's hand position can be empirically analyzed.

Suppose in another scenario that the antenna of a GSM transceiver is in close proximity to the antenna of a WiFi transceiver. Further assume that the GSM frequency band used to facilitate voice communications is near the operational frequency of the WiFi transceiver. Also assume that a use case for voice communications may result in certain physical states of the multimode phone 2400 (e.g., slider out), which can result in a probable hand position of the user of the multimode phone 2400. Such a physical and functional use case can affect the impedance range of the antenna of the WiFi transceiver as well as the antenna of the GSM transceiver.

A close proximity between the WiFi and GSM antennas and the near operational frequency of the antennas may also result in cross-coupling between the antennas. Mutual or cross-coupling under these circumstances can be measured empirically. Similarly, empirical measurements of the impedances of other internal antennas can be measured for particular physical and functional use configurations when utilizing Bluetooth, WiFi, Zigbee, or other access technologies in peer-to-peer communications with another communication device 2408 or with a wireless access point 2410. In diversity designs such as multiple-input and multiple output (MIMO) antennas, physical and functional use cases of a communication device can be measured empirically to determine how best to configure a tunable compensation circuit 1422 such as shown in FIG. 14.

The number of physical and functional use cases of a communication device 1400 can be substantial when accounting for combinations of access technologies, frequency bands, antennas of different access technologies, antennas configured for diversity designs, and so on. These combinations, however, can be empirically analyzed to determine load impedances of the antenna(s), mutual coupling between them, and the effects on transmitter and receiver performance metrics. Mitigation strategies to reduce mutual coupling, counter the effect of varying load impedances, and to improve other performance metrics of the transceiver 102 can also be determined empirically. The empirical data collected and corresponding mitigation strategies can be recorded in the look-up table of FIG. 20 and indexed according to combinations of physical and functional use cases detected by the communication device 1400. The information stored in the look-up table can be used in open-loop RF tuning applications to initialize tunable circuit components of the transceiver 1402, as well as, tuning algorithms that control operational aspects of the tunable circuit components.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 25:
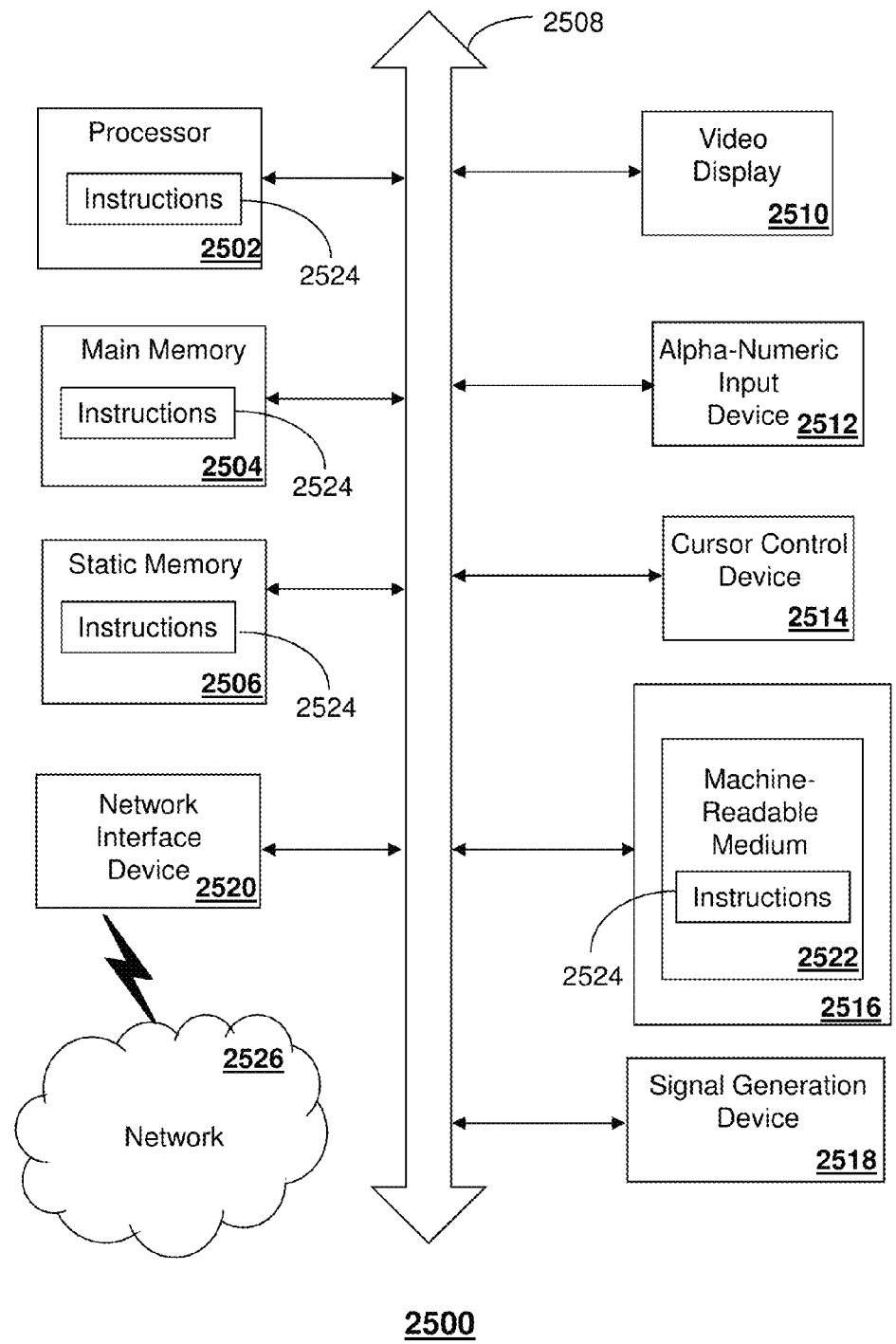
FIG. 25 depicts an illustrative diagrammatic representation of a machine in the form of a computer system within which a set of instructions, when executed, may cause the machine to perform any one or more of the methodologies disclosed herein.

FIG. 25 depicts an exemplary diagrammatic representation of a machine in the form of a computer system 2500 within which a set of instructions, when executed, may cause the machine to perform any one or more of the methods discussed above. One or more instances of the machine can operate, for example, as the communication devices 200, 300, 600, 700, 900, 1400 of FIGS. 2, 3, 6, 7, 9 and 14, respectively. The machine can enable tuning settings to be selected for a matching network based on constant VSWR circles, such as describe with respect to method 500.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video and/or data communication. Further, while a single machine is illustrated, the term "machine" shall also be taken to include any collection of machines that individually or jointly execute a set (or multiple sets) of instructions to perform any one or more of the methods discussed herein.

The computer system 2500 may include a processor (or controller) 2502 (e.g., a central processing unit (CPU), a graphics processing unit (GPU, or both), a main memory 2504 and a static memory 2506, which communicate with each other via a bus 2508. The computer system 2500 may further include a display unit 2510 (e.g., a liquid crystal display (LCD), a flat panel, or a solid state display. The computer system 2500 may include an input device 2512 (e.g., a keyboard), a cursor control device 2514 (e.g., a mouse), a disk drive unit 2516, a signal generation device 2518 (e.g., a speaker or remote control) and a network interface device 2520. In distributed environments, the embodiments described in the subject disclosure can be adapted to utilize multiple display units 2510 controlled by two or more computer systems 2500. In this configuration, presentations described by the subject disclosure may in part be shown in a first of the display units 2510, while the remaining portion is presented in a second of the display units 2510.

The disk drive unit 2516 may include a tangible computer-readable storage medium 2522 on which is stored one or more sets of instructions (e.g., software 2524) embodying any one or more of the methods or functions described herein, including those methods illustrated above. The instructions 2524 may also reside, completely or at least partially, within the main memory 2504, the static memory 2506, and/or within the processor 2502 during execution thereof by the computer system 2500. The main memory 2504 and the processor 2502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 2522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 2500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
selecting, by a processor of a communication device, a target set of tuning settings from among a group of sets of tuning settings responsive to a target VSWR for the target set of tuning settings being a lowest VSWR among a group of VSWR, wherein the target set of tuning settings are for variable reactance elements of a matching network of the communication device, and wherein the group of sets of tuning settings is based on each set of tuning settings of the group of sets of tuning settings being positioned along a circumference of a VSWR circle that is associated with a VSWR determined during communications over a network;
determining, by the processor, whether the target VSWR for the target set of tuning settings satisfies a VSWR threshold;
responsive to a first determination that the target VSWR for the target set of tuning settings satisfies the VSWR threshold, adjusting the variable reactance elements of the matching network based on the target set of tuning settings; and
responsive to a second determination that the target VSWR for the target set of tuning settings does not satisfy the VSWR threshold, adjusting the variable reactance elements of the matching network based on a default set of tuning settings that is not included in the group of sets of tuning settings.

2. The method of claim 1, wherein the tuning settings include a plurality of bias voltages or digital signals and further comprising determining the VSWR threshold according to a radio access technology being utilized for the communications.

3. The method of claim 1, further comprising determining, by the processor, the group of VSWR for the group of sets of tuning settings positioned along the circumference of the VSWR circle, wherein each of the group of VSWR corresponds to one of the group of sets of tuning settings for the variable reactance elements.

4. The method of claim 1, wherein the default set of tuning settings is based on previous tuning settings utilized by the processor.

5. The method of claim 1, wherein the VSWR threshold is based on parameter information of the network.

6. The method of claim 1, wherein the matching network is a pi network including voltage tunable dielectric capacitors.

7. The method of claim 1, wherein the default set of tuning settings is based on previous tuning settings utilized by the processor for impedance matching for free space.

8. The method of claim 1, wherein the determining of the VSWR during communications over the network is based on measuring forward and reflected power via a directional coupler.

9. The method of claim 1, wherein the determining of the VSWR during communications over the network is based on measuring reflected power and is based on power control commands received by the communication device from a base station.

10. The method of claim 1, wherein the determining of the VSWR during communications over the network comprises measuring a reflected power and retrieving the VSWR from a VSWR look-up table stored in the communication device, wherein the VSWR look-up table includes VSWR values indexed by reflected power values.

11. The method of claim 1, further comprising:
monitoring forward power of the communication device; and
determining whether a transmitter power amplifier of the communication device is being load pulled based on a comparison of the monitoring of the forward power with a forward power change threshold.

12. The method of claim 1, further comprising:
monitoring received power of the communication device;
monitoring reflected power of the communication device; and
analyzing an accuracy of the monitoring of the reflected power based on the monitoring of the received power.

13. A communication device, comprising:
a matching network including variable reactance elements;
a controller coupled with the matching network, wherein the controller performs operations comprising:
selecting a target set of tuning settings from among a group of sets of tuning settings responsive to a target VSWR for the target set of tuning settings satisfying a VSWR criterion, wherein the group of sets of tuning settings is based on each set of tuning settings of the group of sets of tuning settings being positioned along a circumference of a VSWR circle that is associated with a VSWR determined during communications over a network;
determining whether the target VSWR for the target set of tuning settings satisfies a VSWR threshold;
responsive to a first determination that the target VSWR for the target set of tuning settings satisfies the VSWR threshold, adjusting the variable reactance elements of the matching network based on the target set of tuning settings; and responsive to a second determination that the target second VSWR for the target set of tuning settings does not satisfy the VSWR threshold, adjusting the variable reactance elements of the matching network based on a default set of tuning settings that is not included in the group of sets of tuning settings.

14. The communication device of claim 13, wherein the VSWR criterion comprises the target VSWR being a lowest VSWR among a group of VSWR, and wherein the default set of tuning settings includes previous tuning settings utilized by the controller.

15. The communication device of claim 14, wherein the operations further comprise determining the group of VSWR for the group of sets of tuning settings positioned along the circumference of the VSWR circle, wherein each of the group of VSWR corresponds to one of the group of sets of tuning settings for the variable reactance elements.

16. The communication device of claim 13, wherein the matching network is a pi network.

17. The communication device of claim 13, further comprising a directional coupler, wherein the determining of the VSWR is based on measuring forward and reflected power via the directional coupler.

18. The communication device of claim 13, wherein the default set of tuning settings is based on impedance matching for the communication device in free space.

19. A non-transitory computer-readable storage medium comprising computer instructions which, responsive to being executed by a processor of a communication device, cause the processor to perform operations comprising:

selecting a target set of tuning settings from among a group of sets of tuning settings responsive to a target VSWR for the target set of tuning settings satisfying a VSWR criterion, wherein the group of sets of tuning settings is selected based on a VSWR determined during communications over a network;

determining whether the target VSWR for the target set of tuning settings satisfies a VSWR threshold;

responsive to a first determination that the target VSWR for the target set of tuning settings satisfies the VSWR threshold, adjusting variable reactance elements of a matching network of the communication device based on the target set of tuning settings; and responsive to a second determination that the target VSWR for the target set of tuning settings does not satisfy the VSWR threshold, adjusting the variable reactance elements of the matching network based on a default set of tuning settings that is not included in the group of sets of tuning settings.

20. The non-transitory computer-readable storage medium of claim 19, wherein the VSWR criterion comprises the target VSWR being a lowest VSWR among a group of VSWR, and wherein the default set of tuning settings includes previous tuning settings utilized by the processor.

* * * * *